United States Patent [19]

Rabinow

[11] 4,284,365
[45] Aug. 18, 1981

[54] REFLECTIVE LANE MARKER FOR ROADWAYS

[75] Inventor: Jacob Rabinow, Bethesda, Md.

[73] Assignee: Hall & Myers, Washington, D.C.; a part interest

[21] Appl. No.: 770,486

[22] Filed: Feb. 22, 1977

[51] Int. Cl.³ .............................................. E01F 9/00
[52] U.S. Cl. ........................................ 404/9; 404/14; 404/16; 350/97; 350/102
[58] Field of Search ................. 404/14, 16, 9; 350/97, 350/103, 102

[56] References Cited

U.S. PATENT DOCUMENTS

| | | | |
|---|---|---|---|
| 1,902,440 | 3/1933 | Gill | 404/16 X |
| 1,903,748 | 4/1933 | Woolums | 404/16 |
| 2,181,613 | 11/1939 | Stewart | 404/16 |
| 2,329,171 | 9/1943 | Russ | 404/9 |
| 2,627,784 | 2/1953 | Pellar | 404/16 |
| 2,666,373 | 1/1954 | Mattson | 404/16 |
| 2,708,858 | 5/1955 | De Shazor | 404/16 |
| 2,991,698 | 7/1961 | Leubaz | 404/16 |
| 3,817,596 | 6/1974 | Tanara | 404/9 X |
| 3,836,226 | 9/1974 | Cechetini | 404/14 X |
| 3,894,791 | 7/1975 | Eigenmann | 404/14 X |

*Primary Examiner*—Nile C. Byers, Jr.
*Attorney, Agent, or Firm*—William D. Hall

[57] ABSTRACT

This invention describes a reflective lane marker for roads which is mounted so that the upper surface of the marker is flush with the road surface. It is so arranged as to reflect light from headlights back in the same general direction from which it comes and which can operate when covered with a film of water. Because it is flush with the road surface, snowplowing can be used without harm to the device.

5 Claims, 11 Drawing Figures

REFLECTIVE LANE MARKER FOR ROADWAYS

BACKGROUND OF THE INVENTION

Reflective road markers for lanes and highways are very old and the problem of designing them so that they cannot interfere with the plowing of snow has been recognized for a long time. Two general approaches have been followed. One is to make them low enough and guarded by protection structures so that snowplows can jump over them, and the second is to make them plastic so they can retract, or give, when hit by a snowplow.

The state of the art of roadway markers which do not form a smooth surface which is a part of the surface of the roadway, is described in the publication entitled "State of the Art on Roadway Delineation Systems", "Prepared for Department of Transportation, Federal Highway Administration, Offices of Research & Development, Washington, D.C. 20590, Report No. FHWA-RD-76-73". Such roadway markers have a short life.

U.S. Pat. No. 2,329,171 to Russ, entitled HIGHWAY MARKER, issued Dec. 7, 1943, discloses a lane marker for roadways which is part of, and does not extend above, the surface of the roadway, but it fails to reflect adequate, if any, light from the headlight of an automobile back to the driver of that automobile.

The principal object of this invention is to provide a marker for roadways that provides adequate reflection of the light from an automobile headlight back to the driver of the automobile.

Another object of the invention is to provide an efficient low cost marker for roadways, that is easy to install, and does not interfere with a snowplow.

Still another object of the invention is to provide a satisfactory roadway marker having long life, to thus reduce the expense of frequent replacement.

SUMMARY OF THE INVENTION

My invention employs a light-refracting prism having an upper surface forming part of the roadway. The light from an automobile headlight is refracted at said surface into the prism. At least one other side of the prism has a reflector, such as a "corner reflectors" that reflect the light rays of each particular wavelength back to said surface along the respective paths that they took when they passed from said surface to said "other" side. The light rays are then refracted toward the automobile from which they originated.

In its broader aspects, however, the invention is not limited to roadway markers or to all of the details hereinabove described.

BRIEF DESCRIPTION OF THE DRAWINGS

When the same reference number is used in different figures, it represents similar parts.

DETAILED DESCRIPTION OF THE DRAWINGS

Figure 1:
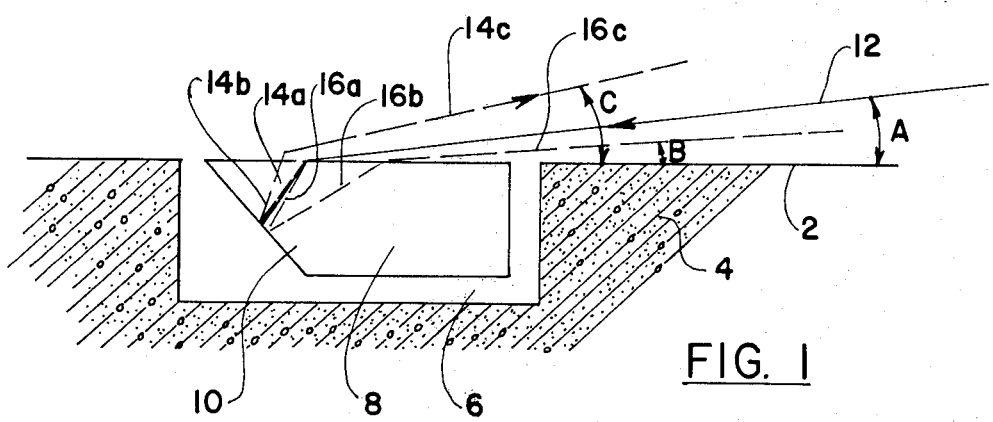
FIG. 1 shows a simplified schematic arrangement of my lane marker invention.

As a preliminary explanation, I refer to the simple schematic diagram of FIG. 1, which shows a road surface 2 of the road body 4 containing a cavity 6 in which my reflecting maker 8 is embedded. For the sake of this figure, no mechanism of assembly is shown and the actual reflecting surface 10 shown is a flat plane which, taken alone, is not satisfactory but which I am using to explain certain basic principles.

A ray of light 12 is shown impinging upon the top surface of my element 8 and is bent downward according to the laws of refraction which I will discuss later. The ray of light impinges on the back surface 10 and is reflected back in the direction from which it came. Using a flat surface for a reflector has an unfortunate effect, however; since the ray of light 12 coming from the headlight (not shown) consists of many colors, they are refracted in different amounts as shown by lines 14a and 16a. The reflections are, therefore, also in different directions as shown by rays 14b and 16b. Thus, light of the central wavelength which may come along that line 12 would be reflected back along the same line 12 while the longer wavelengths, that is, the redder portion of the spectrum, would be bent less and would be reflected along line 14c while the shorter wavelengths, toward the blue end of the spectrum, would be reflected along line 16c.

Figure 2:
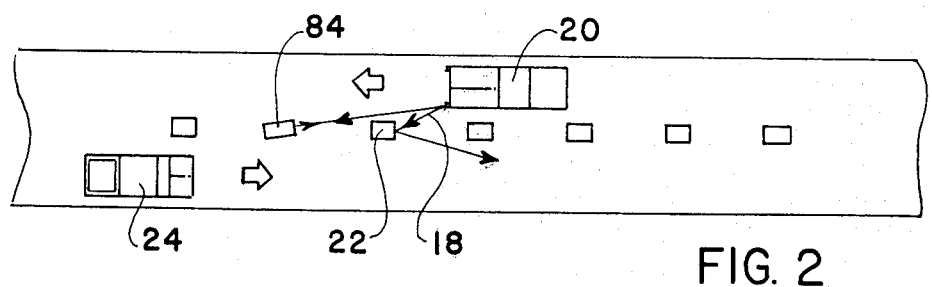
FIG. 2 shows a top view of a road equipped with lane markers. This Figure is used to explain the problems overcome by my invention.

I show in my FIG. 2 a general problem which the prior art has failed to solve. Light 18 from car 20 may come to marker 22 in a two-lane highway, for example. However, that light is reflected back to the other side of the road, serving no purpose to the car where it originates and serving no purpose to the oncoming cars such as 24. These cars are moving in the same direction as the light that is reflected by 22.

One can "tilt" the reflector, as shown at 84, so that it will reflect light in the general direction to the origin except, of course, for the breaking up of the wavelengths as shown in FIG. 1 and for the fact that a plane surface reflector tilted in a particular direction will not reflect the oncoming lights correctly when the car is at a different distance or at a slightly different angle. Thus, if the car is further to the right or further to the left, that particular reflecting angle would be incorrect and, again, the driver will not see the reflected light from his own headlights.

When looking at reflections in a plane mirror, the viewer sees a field of view that is equivalent to looking through a hole of the same size as the mirror, in the same position as the mirror. This is not true of a curved mirror or a reflecting surface comprised of corner reflectors that re-direct and slightly diffuse light that impinges on them. Please note that all taillight reflectors of today's cars are equipped with such reflectors and that they are easily seen by a driver of a car when illuminated by the headlights of the car.

Figure 3:
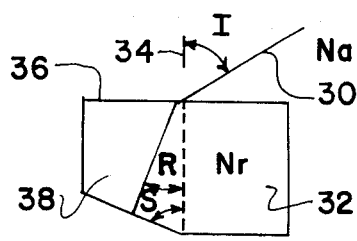
FIG. 3 is a diagram of how light behaves passing between two bodies of different indexes of refraction.

At this point I would like to discuss some of the basic physics of a light beam entering transparent bodies at a small angle. The basic law of refraction is illustrated in FIG. 3. A light beam 30 is shown entering from air into a piece 32 of glass or plastic—the angle that the light makes with a vertical line 34, that is, the line perpendicular to the surface 36 is the angle I. After entering the material, the light 30 is bent toward the perpendicular 34 and proceeds along the line 38 making the angle R with the perpendicular line. The index of refraction of air is labeled Na; the index of refraction in the solid material is labeled Nr. The relationship between these values is that $Na \times \sin I = Nr \times \sin R$. If Na is the refractive index of air which is equal to 1, the relationship becomes $\sin I = Nr \times \sin R$. As the angle I approaches 90°, that is, as the incoming light approaches closer and closer to the surface of the transparent body, sin I becomes equal to 1 and the equation becomes finally $\sin R = 1/Nr$. In this case, R is called the critical angle and R becomes the limiting angle for light to *leave* the solid body. If R becomes any larger than this value, light cannot leave the solid body and the light will be totally internally reflected.

These equations, of course, can be found in any elementary book on optical physics. They are restated here because they are important in describing the operation of my device.

Assuming, in FIG. 1, the height of the headlights above the road to be 27 inches and assuming a distance between the headlights and the reflector of 30 feet or 360 inches, the sign of the angle A of FIG. 1 would be approximately 0.075 and angle A would be approximately 4 degrees. The beam 12 would then be approximately 86 degrees from the vertical. Assuming the refractive index Nr of the plastic (see FIG. 3) to be 1.55, the angle at which the light would pass through the plastic would be 40 degrees from the vertical. This means that the reflecting surface, angle S, would be 50 degrees from the vertical.

Figure 4:
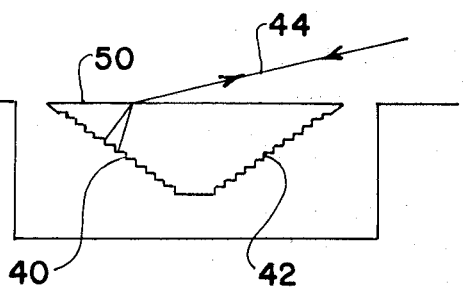
FIG. 4 shows one form of my invention.

As a car approaches the device, the angle A, of course, will increase; that is, the light would come in at a steeper angle. With a plane mirror surface, such as shown in FIG. 1, this light would no longer be reflected essentially back to its source but in a device such as shown in FIG. 4, because the corner reflectors reflect light in the same direction as the source, the light will go back in the correct direction. This is one of the great advantages of using prism reflectors. The light reflection is essentially independent of the wide angles of the direction of the light impinging on the reflectors. This is important since the driver of a car would like to see many of the reflectors buried in the road surface. Some of them may be difficult to see because of dirt, damage, other cars in the path of visibility, and so on, but by using my invention, many of them will be seen clearly and serve their purpose in a way that the prior art does not teach.

In FIG. 4, I substitute a reflecting prismatic surface 40 for the flat surface 10 of FIG. 1 and show a more practical device. For the sake of simplicity, I again do not show any details of mounting but simply a piece of glass or plastic whose top view can be seen in FIG. 5 with side view as shown in FIG. 4, consisting of two prismatic surfaces 40 and 42 so that it can reflect light in two directions. I show one ray of light 44 coming in from the right which bends into the solid according to the laws of refraction, impinges on the prismatic total reflecting surface 40 consisting of smaller right angle surfaces such as are well known as "Corner reflectors". The light is reflected back substantially in the same direction from which it came. This is independent of the fact that different wavelengths of light bend different amounts. They still go back in the directions to reach their source. This means while the original light is broken up as it enters the reflector, all of the light is combined and goes back approximately to the source (which is a headlight). Since the line of sight of the driver is very close to the line by which the light is emitted by the headlights, that is, the driver's head is only slightly above the hood of the car and slightly above the position of the headlights, a good portion of the reflected light will reach his eyes. If the reflecting surfaces were perfect, the light would, of course, go back exactly to the headlight where it originated but because of the normal imperfections of the corner reflectors 40 the design of may device will be entirely satisfactory in that a good portion of the reflected light will be seen by the driver. This is true today of the prismatic reflectors when used in taillights of automobiles and prismatic obstruction markers.

Another disadvantage of the total reflectors is that the angle at which the light impinges on them in the horizontal plane is not critical. If the devices are placed in the median strip, that is, between two lanes of cars moving either in the same direction or opposite directions, the reflectors would reflect the light back to the originating cars even though the cars may be on the opposite sides of the center lane. This would avoid the difficulty which I described in connection with the invention of Russ.

Figure 7:
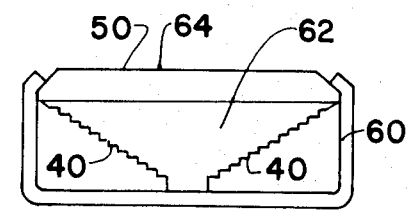
FIG. 7 is a cross-section taken along line 7—7 of FIG. 6.
Figure 5:
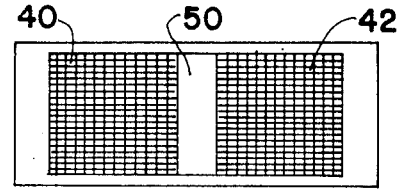
FIG. 5 shows a top view of the device of FIG 4.
Figure 6:
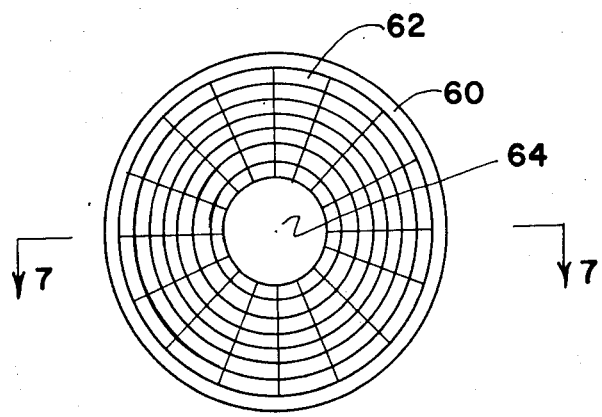
FIG. 6 shows a possible production version of my invention using a circular form of my lane marker.
Figure 8:
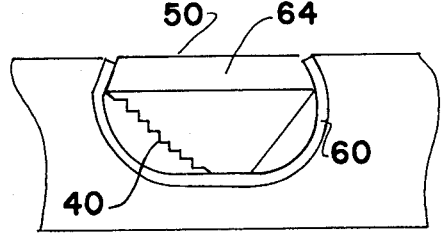
FIG. 8 shows another possible construction of the lane marker.
Figure 9:
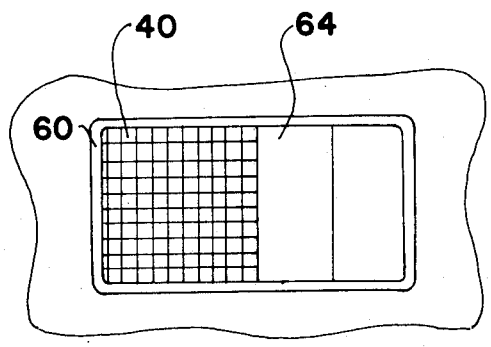
FIG. 9 shows the top view of the device of FIG. 8.

The exact shape of my device is not very critical but a rectangular shape, for example, such as shown in FIG. 5, would be satisfactory or the device could be made circular for ease in assembly or insertion, such as shown in FIGS. 6 and 7. If the light is to be reflected only in one direction, that is, in a case such as in a divided highway where all the cars move in one direction along the lanes of interest, then the prism surface needs to be only on one end of the device, such as shown in FIG. 8. In FIGS. 6 to 9, side 40 is a plurality of "corner reflectors".

In actual production, of course, the device would not be as simple as described so far in FIGS. 1 to 5 but could be constructed as, for example, shown in FIGS. 6 and 7, where the device is housed in a metal housing 60 which is then cemented into the road surface. The metal housing 60 can be attached to the reflecting device 62 by cement or the housing can be pressed or spun over the reflector. The reflecting surface can be suitably coated by silvering, or an air space can be provided behind the reflecting surface, in which case the reflector can be made of plastic, as is customary, and silvering would not be necessary. Since the top of the device may be subjected to wear, it may be desirable to make only the top surface of glass, as shown by 64 in FIGS. 7 and 8. In this construction, the top surface would be glass, immediately behind which could be a plastic reflecting prismatic surface and the assembly would then be enclosed in a metal housing. The use of a sheet of glass or other transparent material does not affect the optical operation of my device. The glass will bend the light as it enters and leaves the glass, but if its surfaces are parallel, the light exiting the glass will be at the same angle as it enters. It will simply be displaced parallel to itself. This has no effect on the operation of my lane marker. As I shall say below, this is also true of a sheet of water on top of the marker. It is obvious, of course, that the reflecting device could be made of glass completely except that at the present time it is very difficult and expensive to make the glass have the necessary prismatic surfaces.

It is particularly important to point out that a layer of water would not affect this type of device as it affects the devices of the prior art. If, for example, one has a lane marker made of glass beads or other reflecting type of paint which may be satisfactory when they are dry, as soon as a layer of water is deposited on these glass beads their optical properties change because the light no longer enters the beads in the same direction. As is well known, it is difficult to see such lines, illuminated by one's own headlights, when they're covered with a sheet of water. This is not true of devices which are raised above the surface of the water and which have reflectors essentially at right angles to the beam of light. But as I said earlier, such devices suffer from the fact that they cannot be swept of snow by the usual snowplows and can only be used in areas and climates where no snow is ever expected.

Figure 10:
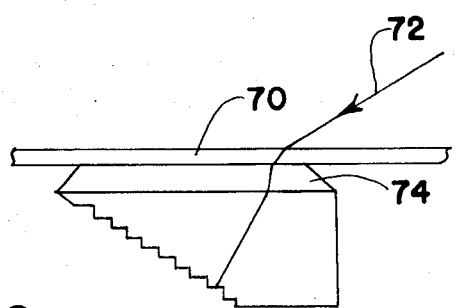
FIG. 10 illustrates the path of light when a marker is covered by water.

My device is not substantially affected by a layer of water because as shown in FIG. 10 the water layer 70 displaces the beam of light 72 coming in but does not change the angles at which the light enters the device itself. This is obvious from the laws of refraction. The light enters the water sheet 70, is bent, and then it enters the glass sheet 74 and all the sheet of water does is displace the beam of light parallel to itself. This is of no consequence since the water sheet is quite thin and this means that the light would still go through the water, through the device, be reflected back, follow its original path and go back to the car.

Figure 11:
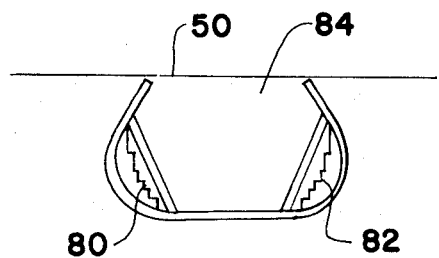
FIG. 11 shows a different possible construction of my lane marker.

In FIG. 11 I show still another possible construction of my invention. In place of having the retroreflector as part of the refractive body of the device, I use one or more thin sheet-like retroreflective elements 80 and 82 located near or fastened to the main portion 84 of the lane marker 84. The number of such retroreflective elements would depend on how many principal directions of light directions the device has to serve. One is needed for a road where all traffic is moving in one direction. Two may be needed for a very wide road or for two directional traffic, etc. Elements 80 and 82 are "corner reflectors".

While throughout this specification I talk about a road surface, it should be realized that my invention can be used in slanted or vertical surfaces as well. It may be used in curbs, or in walls where projecting devices would be undesirable.

It should be recognized, of course, that when light enters a refractive medium at a very small angle, some of it is reflected from the surface by specular reflection. This would be true whether the device is covered by water or not and it is an unfortunate, but necessary, loss of light. However, it is better to have an appreciable portion of light reflected in a direction other than back to its source, than not reflected at all as is done with present markings. Therefore, my invention, is an improvement over present-day painted lines, or reflectors which are not used because they are capable of being struck by snowplows.

In each form of my invention the upper surface 50 of my road marker is a smooth surface, and is flush with, as well as a part of, the smooth surface of the roadway.

The surfaces 40, 42, 80 and 82, being "corner reflectors" have the property of reflecting light received by them back in the opposite direction from whence it came. Sometimes the light rays are reflected back along the same path that they took during their approach to the reflector. In other cases they are reflected back along a path closely adjacent as well as parallel to the path that they took when they approached the reflector.

In general, said reflecting means 40, 42, 80 or 84, as the case may be, is a surface generally perpendicular to the refracted light approaching it, when the light reflected comes from an automobile that is about midway between (a) said marker and (b) the maximum distance at which the marker would normally become visible.

I claim to have invented:

1. A roadway marker, mounted in a roadway, of the type comprising light refracting means which has an upper surface substantially in the same horizontal plane as the surface of the roadway, and reflecting means below said upper surface for receiving the light from an automobile headlight that has passed through said upper surface and has been refracted by said element and for reflecting such light back toward said upper surface, said reflecting means comprising means for reflecting light rays of different wavelengths back to said upper surface with the light of each wavelength returning in the opposite direction that it took when it passed from said upper surface to said reflecting means, to thus produce reflected light that will be refracted by said refracting means and leave said upper surface in the direction of said automobile to thus be visible to the driver of the automobile, characterized by:

said light refracting means comprising a prism, said upper surface comprising one side of said prism, said reflecting means comprising two side walls of said prism each of which side walls are relatively flat with indentations to form corner reflecting surfaces, said side walls being positioned to respectively reflect light approaching said upper surface from opposite directions.

2. A roadway marker comprising light refracting means having a light refracting portion including an upper surface, mounting means adapted to be secured to the roadway, for carrying said light refracting means and positioning said upper surface to be a part of the surface of the roadway, and reflecting means below said upper surface for receiving the light from an automobile headlight that impinged upon said surface and was refracted by said light-refracting means and for reflecting such light back toward said upper surface, said reflecting means comprising means for reflecting light rays, passing from said upper surface to said reflecting means, back to said upper surface in the opposite direction that the rays passed on their way to the reflecting means, said reflecting means having two reflectors for respectively reflecting essentially all of the light rays that passed from said upper surface and which came from the headlights of automobiles approaching in first and second opposite directions that impinges upon said upper surface, characterized by:

said light refracting means comprising a prism, said upper surface comprising one side of said prism,
said reflecting means comprising two other sides of said prism.

3. A roadway marker as defined in claim 2 in which said other sides of said prism have a reflective coating thereon.

4. A roadway marker as defined in claim 2 comprising mounting means for said prism to mount the prism in a roadway with an air spaces adjacent said other sides of said prism to render said other sides reflective to light rays approaching it through the prism from said upper side.

5. A roadway marker comprising
light refracting means having a light refracting portion including an upper surface,
mounting means adapted to be secured to the roadway, for carrying said light refracting means and positioning said upper surface to be a part of the surface of the roadway, and
reflecting means below said upper surface for receiving the light from an automobile headlight that impinged upon said surface and was refracted by said light-refracting means and for reflecting such light back toward said upper surface,
said reflecting means comprising means for reflecting light rays, passing from said upper surface to said reflecting means, back to said upper surface in the opposite direction that the rays passed on their way to the reflecting means,
said reflecting means having two reflectors for respectively reflecting essentially all of the light rays that passed from said upper surface and which came from the headlights of automobiles approaching in first and second opposite directions that impinges upon said upper surface,
characterized by:
said light refracting means comprising a prism,
said upper surface comprising one side of said prism,
said reflecting means comprising at least one corner reflector outside of said prism and adjacent another side of said prism.

* * * * *